United States Patent
Planck et al.

(10) Patent No.: US 8,584,401 B2
(45) Date of Patent: Nov. 19, 2013

(54) APPARATUS AND METHOD PERTAINING TO A PRE-CONFIGURED POST FOR USE WITH AN AUTOMATICALLY-MOVABLE BARRIER

(75) Inventors: Randy L. Planck, South Elgin, IL (US); Theodore Brent Freese, Sugar Grove, IL (US); William G. Gioia, Winfield, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 458 days.

(21) Appl. No.: 12/331,978

(22) Filed: Dec. 10, 2008

(65) Prior Publication Data
US 2010/0139170 A1  Jun. 10, 2010

(51) Int. Cl.
*E01F 13/00* (2006.01)
(52) U.S. Cl.
USPC ............. 49/49; 49/334; 49/365; 404/6; 404/9
(58) Field of Classification Search
USPC ................ 49/365, 49, 333, 334; 404/6, 9, 10; 247/147; 256/13.1
See application file for complete search history.

(56) References Cited

U.S. PATENT DOCUMENTS

| | | | |
|---|---|---|---|
| 216,777 A | 6/1879 | Barry | |
| 1,350,134 A | 8/1920 | Bellican | |
| 1,492,257 A | 4/1924 | Moore | |
| 1,578,780 A | 3/1926 | Titus | |
| 1,645,977 A | 10/1927 | Titus | |
| 1,903,923 A | 4/1933 | Hyde | |
| 2,563,894 A * | 8/1951 | White | 49/226 |
| 3,287,757 A | 11/1966 | Noord | |
| 3,572,223 A * | 3/1971 | Vierregger | 2/296 |
| 4,367,610 A | 1/1983 | Goode | |
| 4,430,638 A * | 2/1984 | Parker | 340/473 |
| 4,489,306 A * | 12/1984 | Scolari | 340/473 |

(Continued)

FOREIGN PATENT DOCUMENTS

| | | | | |
|---|---|---|---|---|
| EP | 443052 A1 * | 8/1991 | | E01F 13/00 |
| FR | 2586745 A1 | 3/1987 | | |

OTHER PUBLICATIONS

LiftMaster Professional Addendum to LA400 Owner's Manual, 2006, 2 pages.

(Continued)

*Primary Examiner* — Katherine Mitchell
*Assistant Examiner* — Marcus Menezes
(74) *Attorney, Agent, or Firm* — Fitch Even Tabin & Flannery LLP (57) ABSTRACT

A post (200) for use with an automatically-movable barrier (1203) and a motive actuator (1204) is configured to interact with the barrier to thereby facilitate movement of the barrier with respect to the post. This post can have at least one cavity (201, 801) formed axially therein and a mains-power-bearing pathway (202) disposed within this at least one cavity to convey mains electrical power to movable barrier control circuitry (1202) as well as the motive actuator. Such a post can further comprise one or more integral pivot points (1001) that are configured to pivotally engage the automatically-movable barrier such that the automatically-movable barrier can selectively pivot about the integral pivot point. By another approach, such a post can further comprise one or more rollers (1101) that are configured to engage the automatically-movable barrier such that the latter can selectively move in a lateral direction through engagement with the roller(s).

16 Claims, 6 Drawing Sheets

(56) References Cited

U.S. PATENT DOCUMENTS

| | | | |
|---|---|---|---|
| 4,531,325 A * | 7/1985 | Phillips | 49/49 |
| 4,870,543 A * | 9/1989 | Born et al. | 362/542 |
| 4,893,119 A * | 1/1990 | Nasatka | 340/928 |
| 4,934,203 A | 6/1990 | Bailey et al. | |
| 5,035,082 A * | 7/1991 | Butler | 49/334 |
| 5,133,152 A * | 7/1992 | Grancagnolo | 49/239 |
| 5,136,813 A * | 8/1992 | Gibbs et al. | 49/404 |
| 5,373,664 A * | 12/1994 | Butler | 49/358 |
| 5,394,651 A | 3/1995 | Vial | |
| 5,499,887 A * | 3/1996 | Verra | 404/6 |
| 5,500,642 A * | 3/1996 | Battle | 340/932.2 |
| 5,804,938 A | 9/1998 | Richmond et al. | |
| 5,829,913 A * | 11/1998 | Puckett | 404/6 |
| 5,869,940 A | 2/1999 | Parsadayan | |
| 6,364,374 B1 | 4/2002 | Noone et al. | |
| 6,487,818 B1 | 12/2002 | Hamann et al. | |
| 6,650,076 B1 | 11/2003 | Hom et al. | |
| 6,712,547 B1 * | 3/2004 | Shauf et al. | 404/9 |
| 6,742,303 B2 * | 6/2004 | Pedemonte | 49/339 |
| 6,883,275 B2 | 4/2005 | Hellinga et al. | |
| 6,935,000 B1 | 8/2005 | Arnaud | |
| 7,000,355 B2 * | 2/2006 | Flory et al. | 49/365 |
| 7,107,722 B2 | 9/2006 | Casali et al. | |
| 7,146,766 B2 | 12/2006 | Finkelstein | |
| 7,287,929 B1 * | 10/2007 | Sokolowski et al. | 404/6 |
| 7,367,161 B1 * | 5/2008 | Jones | 49/334 |
| 7,472,891 B2 * | 1/2009 | Schram et al. | 256/65.14 |
| 7,958,675 B2 * | 6/2011 | Stull | 49/324 |
| 2001/0037600 A1 | 11/2001 | Hormann | |
| 2003/0015980 A1 | 1/2003 | Richmond et al. | |
| 2004/0145332 A1 | 7/2004 | Hom et al. | |
| 2004/0177558 A1 | 9/2004 | Parsadayan et al. | |
| 2007/0075655 A1 | 4/2007 | VanDrunen et al. | |
| 2007/0221904 A1 * | 9/2007 | Stull | 256/73 |
| 2010/0139170 A1 | 6/2010 | Plank et al. | |
| 2010/0139188 A1 | 6/2010 | Callentine | |
| 2010/0223853 A1 | 9/2010 | Daniel-Wayman | |

OTHER PUBLICATIONS

LiftMaster Professional Owner's Manual Model LA400, 2007, 32 pages.

* cited by examiner

APPARATUS AND METHOD PERTAINING TO A PRE-CONFIGURED POST FOR USE WITH AN AUTOMATICALLY-MOVABLE BARRIER

RELATED APPLICATION(S)

This application is related to co-pending and co-owned U.S. patent application Ser. No. 12/331,964, filed on Dec. 10, 2008, now U.S. Pat. No. 8,413,297, entitled APPARATUS AND METHOD PERTAINING TO A PIVOTING BARRIER, which is incorporated by reference in its entirety herein.

TECHNICAL FIELD

This invention relates generally to automatically-movable barriers and more particularly to posts as are employed therewith.

BACKGROUND

Movable barriers of various kinds are known in the art. These include pivoting barriers such as, but not limited to, gates and carriage house garage doors of various kinds that pivot at one end thereof with respect to a support component. This also includes sliding barriers such as gates or the like that slide back and forth in a lateral direction between opened and closed positions. It is also known to employ a barrier operator to control the automatic movement of such movable barriers. Such an approach can serve, for example, to permit the automatic opening and closing of the movable barrier.

In many cases such installations involve the use of one or more posts. (As used herein, the word "post" will be understood to refer to a long member (typically having a circular or rectangular cross section) that protrudes from the ground.) Such a post provides a surface against which, for example, the movable barrier can pivot and/or slide. Such a post also often provides a support surface upon which the barrier operator can be conveniently mounted.

Posts, of course, comprise a very well-understood area of endeavor. Notwithstanding long-standing familiarity with such a construct, however, various issues and concerns can and do arise as correspond to the use of a post for such purposes. As one example in these regards, it is usually necessary to route mains power to the barrier operator and this, in turn, requires routing the corresponding electrical conductors on the post that bears the barrier operator. This can result in installations where the wiring is exposed to damage from both the elements and from activity in the vicinity, Other problems that can occur include an inappropriate gauge of conductor, a waste of materials when the conductor is inappropriately cut during installation, and resultant work product that lacks aesthetic appeal due to the exposed wiring. As another example in these regards, when using the post as a support surface for a movable barrier interface (such as one or more pivot points, roller interfaces, or the like), this can result in the misplacement and/or misalignment of such elements.

Furthermore, even when the installer makes no such errors, present installation paradigms in these regards tend to be unduly time consuming (in no short measure due to the care with which the installer must treat a post-oriented installation procedure).

BRIEF DESCRIPTION OF THE DRAWINGS

The above needs are at least partially met through provision of the apparatus and method pertaining to a pre-configured post for use with an automatically-movable barrier described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, cross-hatching as may appear in these illustrations is not intended to suggest the use of any particular material unless a specific contrary representation in this regard is set forth. Further, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a post for use with an automatically-movable barrier and a motive actuator that is configured to selectively move the automatically-movable barrier is configured to interact with the automatically-movable barrier to thereby facilitate movement of the automatically-movable barrier with respect to the post. This post can have at least one cavity formed axially therein and a mains-power-bearing pathway disposed within this at least one cavity to convey mains electrical power to movable barrier control circuitry as well as the motive actuator.

By one approach, such a post can further comprise one or more integral pivot points that are configured to pivotally engage the automatically-movable barrier such that the automatically-movable barrier can selectively pivot about the integral pivot point. By another approach the post can further comprise integral structures that are configured to engage the barrier operator. By another approach, such a post can further comprise one or more rollers that are configured to engage the automatically-movable barrier such that the latter can selectively move in a lateral direction through engagement with the roller(s). Of course this post with rollers can also further comprise integral structures that are configured to engage the barrier operator.

These teachings are highly flexible and will readily accommodate, for example, providing more than one such cavity to thereby accommodate more than one conductive pathway. This, in turn, will permit the post to contain both mains power as well as, for example, low-voltage power, signal-bearing content, and so forth.

So configured, these teachings permit a post to be employed when installing an automatically-movable barrier in a manner that greatly reduces time requirements while also tending to ensure a more reliable, convenient, and aesthetically pleasing result. These teachings are highly leveragable and can therefore be employed successfully with a wide variety of existing automatically-movable barriers and their corresponding motive elements and controllers. These teachings are also highly scalable and can be employed in a wide variety of differing physical application settings. Those skilled in the art will further appreciate that these teachings are also readily enabled in a very economical manner.

Figure 1:
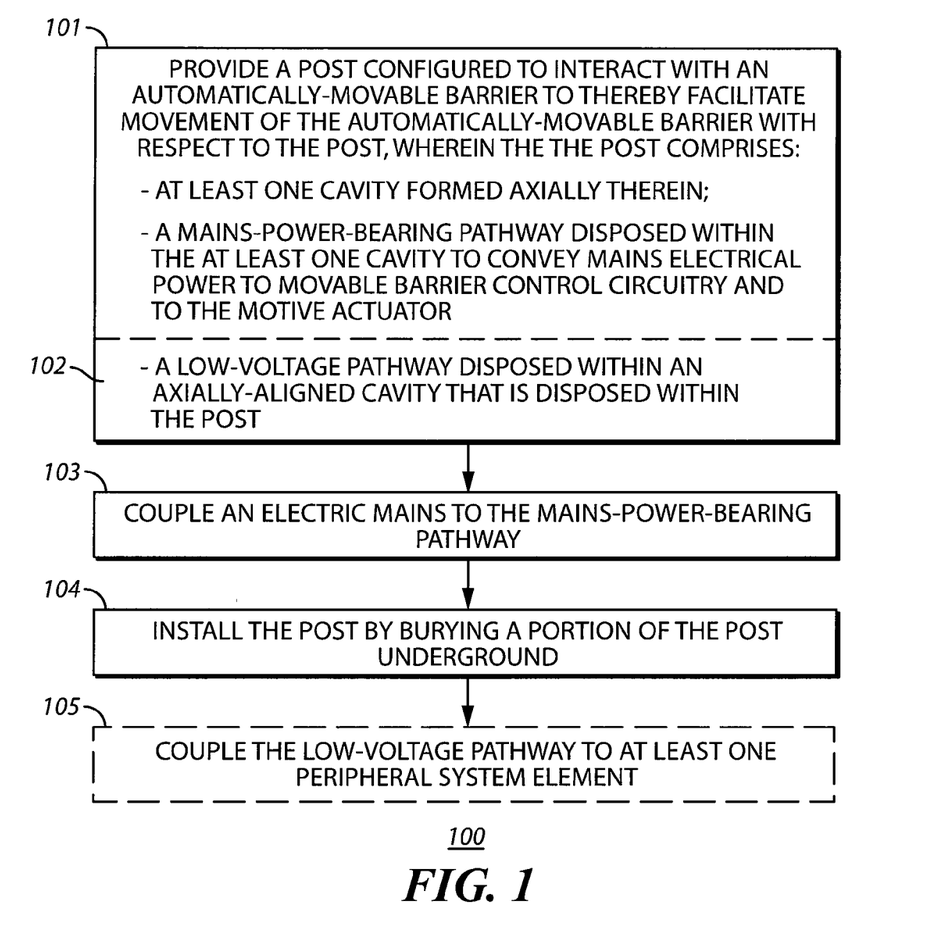
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process that is compatible with many of these teachings will now be presented. The described process 100 is particularly applicable for use in application settings that include an automatically-movable barrier (such as, but not necessarily limited to, a pivoting barrier, a sliding barrier, or the like) and a corresponding motive actuator that is configured to selectively move the aforementioned barrier (such as a motor and/or any of a wide variety of linkage mechanisms as are known in the art).

This process 100 comprises a particular approach to pivotally associating a pivoting barrier to a corresponding post. (For the purposes of illustration in the following description, this "post" will be presumed to comprise a long dowl-like member (having a circular or rectangular cross section) that protrudes from the ground. As used herein, however, this term will also be understood to include structures that serve a similar functional purpose in these regards, such as, but not limited to, the end of a metal, wooden, stone, or brick material fence.)

Figure 13:
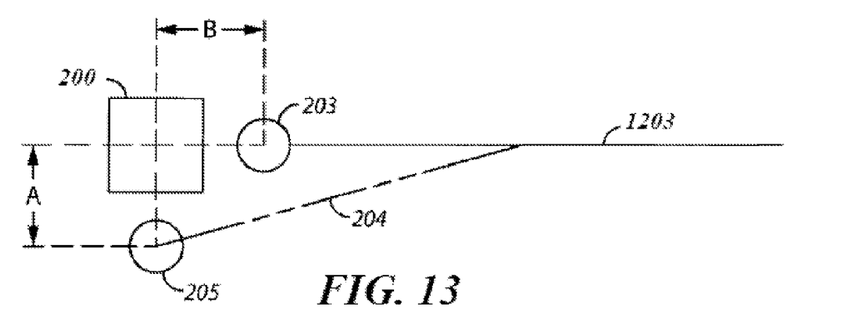
FIG. 13 comprises a top plan schematic view as configured in accordance with various embodiments of the invention.

It may be helpful to note that this process 100 can be employed to achieve a particular desired predetermined geometry as pertains to the pivotal coupling of the pivoting barrier to the aforementioned post. Referring momentarily to FIG. 13, the pivoting barrier 1203 will pivotally couple to the post 200 at a corresponding pivot point 203. In turn, a linear actuator arm 204 will couple between the pivoting barrier 1203 and a corresponding fixed point 205 as corresponds to the post 200. So configured, as the linear actuator arm 1204 shortens in length the pivoting gate 1203 will be pivoted (in this illustration) clockwise. The applicant has determined that a desired physical geometry is for the dimension denoted as "A" to equal the dimension denoted as "B." When such is the case, the speed and forces of the pivoting gate 1203 will tend to be sufficiently predictable and symmetrical (for example, these operating parameters will tend to be more symmetrical with respect to the first half of the path of travel and the second half of the path of travel) and hence permit the development and use of correspondingly reliable operating strategies in these regards. As will be shown below, the present teachings are considerably helpful in these regards.

Pursuant to one step 101, (and referring as well momentarily to FIG. 2), this process 100 provides a post 200 that is configured to interact with the aforementioned automatically-movable barrier to thereby facilitate movement of the automatically-movable barrier with respect to the post. By one approach, this post 200 includes at least one cavity 201 formed axially therein. This cavity 201 can be centrally located (as suggested by the illustration presented in FIG. 2) or can be located off-center as desired. This cavity can have substantially constant cross-sectional dimensions for its entire length or can have dimensions that vary (for example, to accommodate some corresponding form factor of the post 200 itself). And, though it is possible for this cavity 201 to extend the entire length of the post 200 (and hence run from the bottom to the top of the post 200), it a more likely embodiment this cavity 201 will not be coextensive with the entire length of the post 200.

Figure 3:
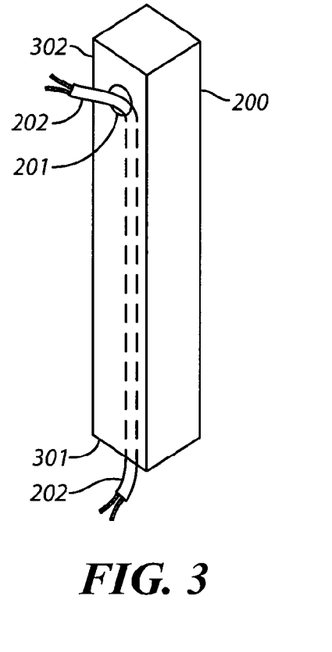
FIG. 3 comprises a perspective view as configured in accordance with various embodiments of the invention.

Furthermore, and referring now momentarily to FIG. 3, though extending axially within the post 200, this cavity 201 will also likely, in at least some embodiments, include a branch that will extend towards a side of the post 200 to thereby provide access to the cavity 201 from the side of the post 200. In the illustration provided, for example, an upper end of the cavity 201 is seen to extend to a side of the post 200 near the upper end thereof.

Figure 2:
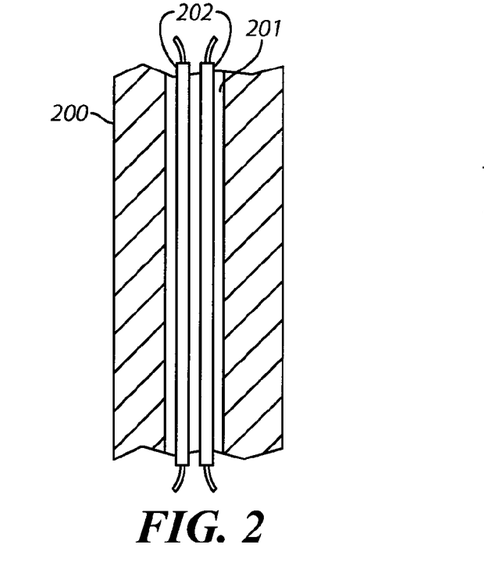
FIG. 2 comprises a front elevational, detail view as configured in accordance with various embodiments of the invention.

There are various ways by which such a cavity 201 can be formed in the post 200. By one approach, for example, the cavity 201 can be formed through a drilling or other material-removal process. Such an approach is well suited to posts comprised of wood, for example. By another approach, this cavity 201 can be formed when initially forming the post itself. Such an approach is well suited to posts that are formed of plastic using a molding process.

Referring now to FIGS. 1, 2, and 3, this post 200 can also comprise a mains-power-bearing pathway 202 that is disposed within the cavity 201 to thereby convey mains electrical power to movable barrier control circuitry (not shown) and to a corresponding motive actuator (not shown). (The expression "mains" will be understood to refer to a supply of general purpose alternating current (AC) electrical power such as the 120 volt supply available in most homes in the United States. Other common expressions for a same supply are household power, household electricity, domestic power, wall power, line power, AC power, city power, and grid power.) By one approach, this can comprise, for example two (or three) separate insulated copper conductors as suggested by the illustrations provided. The gauge(s) of these conductors can vary with the anticipated loading as corresponds to a given application setting.

By one approach, and as is suggested in FIG. 3, the conductors comprising this pathway 202 can extend somewhat beyond the external openings to the cavity 201. For example, as shown in FIG. 3, the conductors of this pathway 202 can extend through an opening in the bottom 301 of the post 200 with an opposing end of the pathway 202 extending through a corresponding opening near the top 302 of the post 200.

Having these conductors extend through the bottom of the post 200 may be useful in application settings where such a configuration is desirable (as when, for example, the electric mains is deeply buried).

Figure 4:
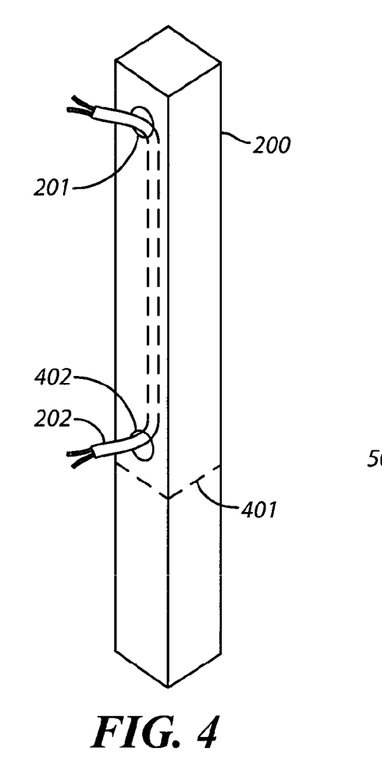
FIG. 4 comprises a perspective view as configured in accordance with various embodiments of the invention.

In other cases, it may be useful to have the lowermost point of access to the cavity 201 (and hence to the corresponding conductive pathway 202) at a point between the top and bottom of the post 200. For example, and referring now momentarily to FIG. 4, a given post 200 may have a predetermined installed burial depth (denoted in this figure by the phantom line that bears reference numeral 401) and it may be appropriate for whatever reason to couple the mains-power-bearing pathway 202 at a point that is located above this installed burial depth. In such a case, a point-of-access 402 to the cavity 201/pathway 202 can be located on a side of the post 200 that is proximal to (say, within a few inches such as one to six inches) but above this installed burial depth.

Figure 5:
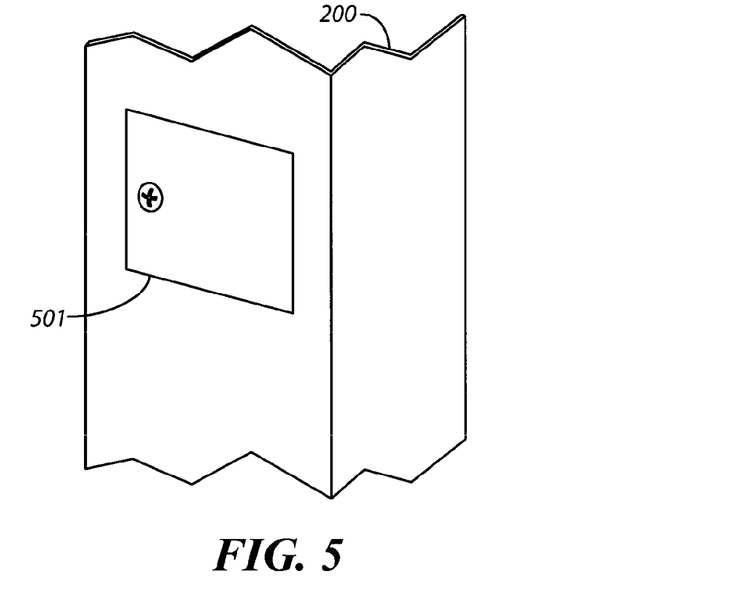
FIG. 5 comprises a perspective, detail view as configured in accordance with various embodiments of the invention.

There are various ways by which such a point-of-access can be configured. By one approach, as noted above, the point-of-access can simply comprise an opening in the post 200 that communicates with the aforementioned cavity 201 and that hence provides access to the mains-power-bearing pathway 202. Since such a point-of-access may, or may not, be utilized in every application setting, and referring momentarily to FIG. 5, it may be useful to provide a user-removable cover 501 that provides selective access to this point-of-access. There are various known approaches for such a cover; as these teachings are not particularly sensitive to any given choice in these regards, further elaboration will not be presented here regarding such a cover.

Figure 6:
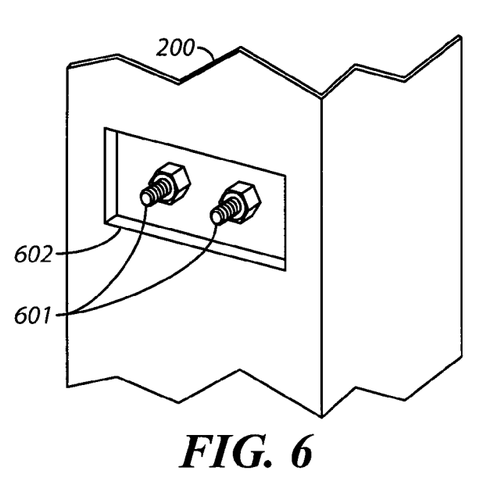
FIG. 6 comprises a perspective, detail view as configured in accordance with various embodiments of the invention.
Figure 7:
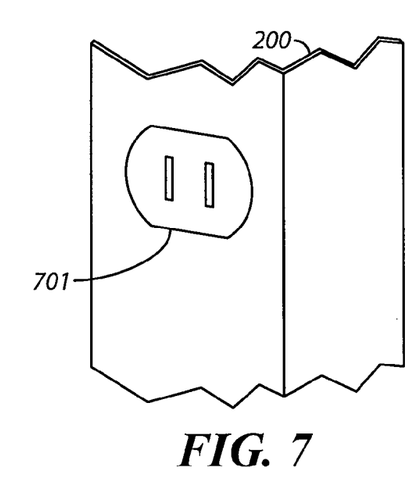
FIG. 7 comprises a perspective, detail view configured in accordance with various embodiments of the invention.

As noted above, the mains-power-bearing pathway 202 can simply extend outwardly from, or be otherwise accessible within, such a point-of-access. If desired, and referring now to FIG. 6, a wiring-block approach could be utilized. By this approach, for example, the mains-power-bearing pathway 202 conductors can couple to the interior side of a given number of conductive threaded members 601. The electrical mains (not shown) can then be physically and electrically coupled to these conductive threaded members 601 as well and held in place using, for example, corresponding nuts, to form the desired electrical circuit. Such a wiring block can be recessed 602 as shown if desired, or rendered flush to or raised away from the exterior surface of the post 200. As yet another related approach, and referring now to FIG. 7, the point-of-access can comprise an electrical socket 701. (A given example of an electrical socket is shown in FIG. 7; those skilled in the art will recognize that a wide variety of such sockets, including sockets having a different number of conductors, differing blade patterns, and differing blade shapes are known in the art and that the particular example shown here serves only in an illustrative capacity.) (Those skilled in the art will recognize that a standard electrical socket of choice can be similarly used at any desired location on the post 200 to serve as an externally-accessible electrical socket that permits an external electrically-powered device to electrically couple to the mains-power-bearing pathway 202 to receive enabling electrical power. This electrically-powered device can comprise a part of the overall movable barrier system or can comprise something that is independent of the system such as an electrically-powered hand tool, garden tool, or the like.)

Figure 8:
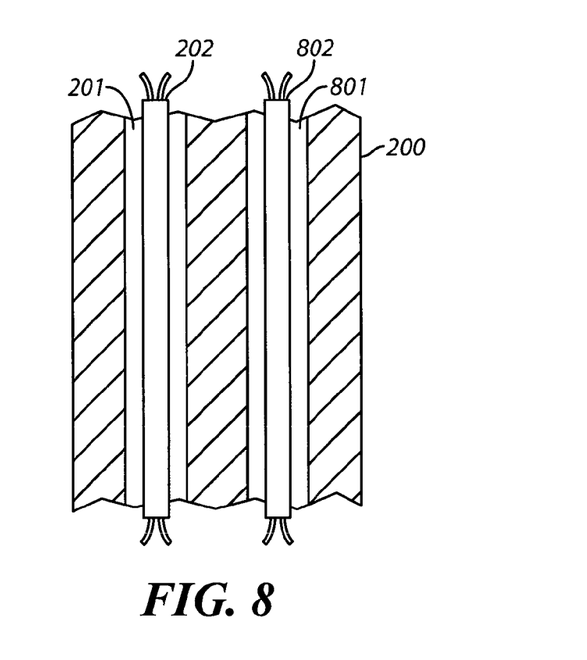
FIG. 8 comprises a front elevational, detail view as configured in accordance with various embodiments of the invention.

So configured, mains electricity can be routed within the post 200 to provide power to corresponding movable barrier components as desired. With reference to FIGS. 1 and 8, this process 100 will also optionally accommodate providing two or more such cavities 201 and 801) in the post 200. These cavities can be substantially coextensive with one another or can have different lengths as befits their intended corresponding purpose. In some cases it may be useful for two or more of these cavities to merge into a single cavity. In other cases these cavities can be fully separated from one another. It would also be possible for two or more of these cavities to share a common point-of-access or for each such cavity to have a separate and discrete corresponding point-of-access.

Using this approach, for example, one of the cavities 201 can be used to contain the mains-power-bearing pathway 202 to the exclusion of any other electricity-bearing pathway while, for example, a second cavity 801 can have a low-voltage pathway 802 disposed therein to carry low-voltage electricity that comprises a power source. (As used herein, low-voltage will be understood to refer to a voltage that is less than a mains level with illustrative examples being 48 volts, 12 volts, 5 volts, and the like.) This low voltage electricity can be used, for example, to power one or more peripheral system elements such as, but not limited to, obstacle detectors of various kinds (to detect obstacles in the pathway of the movable barrier), vehicle detectors (such as, but not limited to, so-called loop detectors, photobeams, or the like), an access-control user interface (such as, but not limited to, a keypad, a microphone and/or speaker arrangement, a display screen, a cursor control device, and so forth), lighting (including security lighting, decorative lighting, informational lighting, and so forth), one or more cameras (including surveillance cameras, closed-circuit cameras, motion-detection cameras, and so forth), one or more wireless interfaces, and/or control electronics of various kinds.

By another approach, in combination with the above or in lieu thereof, the aforementioned low-voltage electricity can comprise a signal carrier. The signal can comprise information be carried to, or from, one or more peripheral system elements such as those noted above. The carrier itself can comprise any of a wide variety of modulation approaches including both analog and digital approaches. Such approaches are generally very well known in the art and require no further elaboration here.

Figure 9:
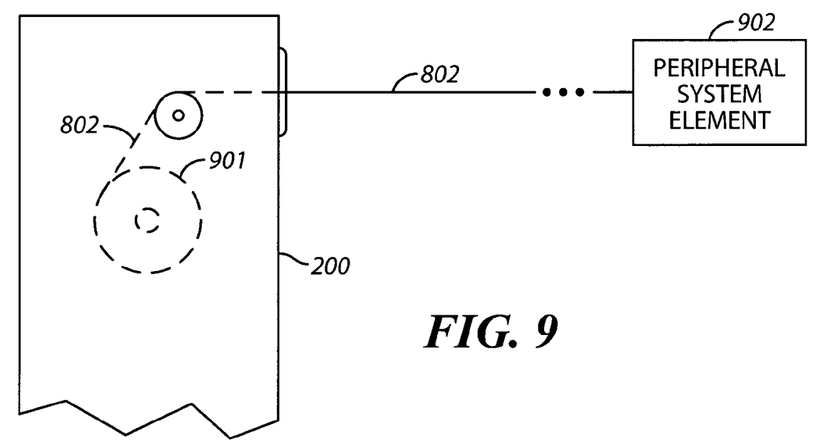
FIG. 9 comprises a front elevational schematic view as configured in accordance with various embodiments of the invention.

With reference now momentarily to FIG. 9, these teachings will also accommodate providing a post 200 having an automatic retractor 901 disposed therein that is configured to permit an electrical conductor 802 to be withdrawn from within the post 200 and to automatically retract that electrical conductor 802 back within the post 200. Various such retractor mechanisms are known in the art and do not require additional description here. Such an approach can be used, for example, to provide mains electricity and/or low-voltage electricity to one or more peripheral system elements 902. This can be particularly useful when providing power and/or a signal path to a peripheral element that moves during ordinary use with respect to the post 200. One example in this regard would be a barrier-mounted obstacle detector that moves with a sliding gate as the gate moves back and forth between closed and opened positions.

As noted earlier, such a post 200 can be employed when installing and subsequently operating a variety of different movable barriers. In some cases, those movable barriers comprise pivoting movable barriers. In such a case, if desired (and referring now to FIG. 10), the post 200 can further comprise an integral pivot point 1001 that is configured to pivotally engage the automatically-movable barrier such that the latter can selectively pivot about the integral pivot point 1001. As stated, this pivot point 1001 can comprise an integral part of the post 200. By one approach, for example, the pivot point 1001 and the post 200 can comprise a single molded product. By another approach, as another example, the pivot point 1001 can be welded to the post 200 to form an integral and permanent connection. (Only a single pivot point is shown in FIG. 10; those skilled in the art will recognize that a plurality of pivot points may be provided as appropriate to suit the needs of a given application setting.)

Figure 10:
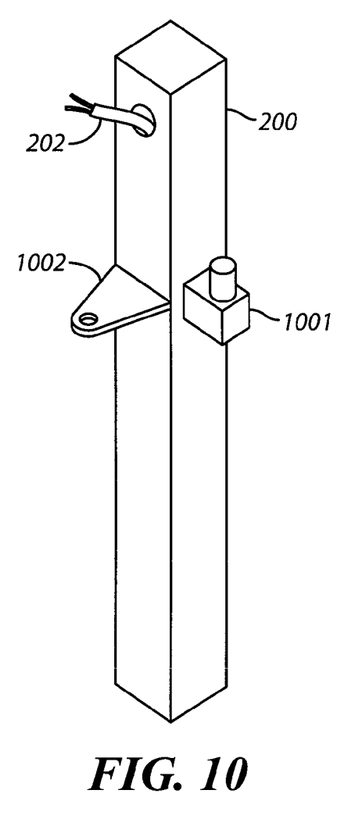
FIG. 10 comprises a perspective view as configured in accordance with various embodiments of the invention.

As shown in FIG. 10, the post 200 can also have integrally formed therewith a support surface 1002 to provide a point at which a actuator, such as a linear actuator arm (not shown) can be connected (and where the opposing end of the actuator connects to the movable barrier to thereby serve as the motive mechanism to cause the barrier to pivot about the aforementioned pivot point 1001). The interested reader will find additional details regarding such a pivot point 1001 and such a support surface 1002 in the aforementioned patent application entitled APPARATUS AND METHOD PERTAINING TO A PIVOTING BARRIER.

In the example above the movable barrier comprised a barrier that moved about a pivot point. In some cases, the movable barrier instead comprises a sliding barrier and moves laterally between closed and opened positions. Rollers are often used to facilitate this movement. If desired, and referring now to FIG. 11, one or more rollers 1101 can also be provided on the post at the time of manufacture to serve in these regards. It would also be possible to provide an integral mounting hole, bracket, or the like at locations where such a roller could be mounted if desired. For example, mounting opportunities could be provided at positions on the post 200 that correspond to various sized movable barriers. The rollers could then be appropriately located at the time of installation to suit the dimensions of the movable barrier being accommodated.

In any event, and referring again to FIG. 1, this process 100 provides the step 102 of coupling the electric mains to the aforementioned mains-power-bearing pathway 202. The specific details of this coupling will of course vary with respect to the details of the particular post 200. For example, when a mounting block has been provided for this purpose, the conductors for the electric mains can be coupled to the mains-power-bearing pathway 202 using that mounting block.

Figure 12:
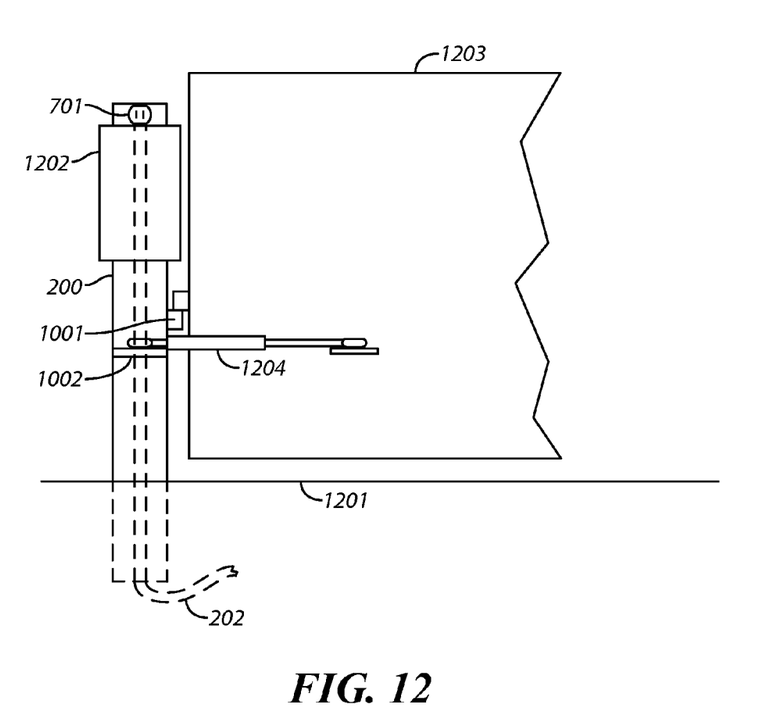
FIG. 12 comprises a front elevational schematic detail view as configured in accordance with various embodiments of the invention.

Referring now to both FIGS. 1 and 12, this process 100 also provides the step 103 of installing the post 200 by burying a portion of the post 200 under the ground 1201. As mentioned earlier, a given post can be designed to be buried to a predetermined level (for example, to accommodate the requirements of a particular building code in a particular region, municipality, or the like).

In the case where the post 200 connects to the electric mains through the bottom of the post 200, these steps 103 and 104 are likely executed in the order shown. When the connection to the electric mains is made through a side of the post 200 as described above, then these steps 103 and 104 are likely executed in a verse order as it may be easier to make the electrical connections one the post 200 is stably disposed in an installed position.

So configured, control circuitry 1202 for the barrier operator system can be conveniently mounted on the post 200 in a location that provides easy access to the mains-power-bearing pathway to provide operating electrical power to the control circuitry 1202. So configured, it will be recognized and appreciated that this electrical connection, in this particular embodiment, is accomplished without exposing the mains delivery pathway to view or other easy accessibility. This approach not only greatly simplifies and eases installation of the system, it is both more aesthetically pleasing and considerably more secure as well.

In a case where the post 200 has a predetermined installed burial depth and also where external access to the cavity 201 and the mains-power-bearing conductor 202 located therein is made through a side of the post 200 at a location that is near the aforementioned depth (yet above the ground level), this connection to the mains can be made via, for example, the use of conduit or the like to protect the mains wiring from the elements, unauthorized access, or the like.

As noted earlier, these teachings will accommodate the provision of one or more low-voltage pathways (to convey power, signaling, or both) through the post 200. In such a case, this process 100 will also optionally accommodate the installation step 105 of coupling at least one of these low-voltage pathways to at least one peripheral system element (such as any of the elements described above). This approach can be used both with peripheral system elements that are mounted on (or in) the post 200 itself and also with peripheral system elements that are installed elsewhere (such as in or on the ground, on the movable barrier, and so forth).

When the post 200 has one or more integral pivot points 1001 as described above, these teachings will readily accommodate then installing the automatically-movable barrier 1203 on the integral pivot point 1001. (Again, the interested reader is referred to more details as may be found in this regard in the aforementioned patent application entitled APPARATUS AND METHOD PERTAINING TO A PIVOTING BARRIER.) In this particular example, a linear actuator arm 1204 can then be appropriately connected between the post 200 (using, for example, the aforementioned integral support surface 1002) and the movable barrier 1203 itself. So configured, contraction and extension of the linear actuator arm 1204 will cause a corresponding controlled pivoting of the movable barrier 1203 about the aforementioned pivot point 1001.

Figure 11:
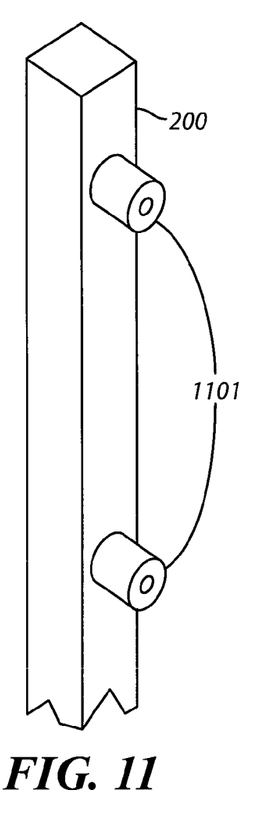
FIG. 11 comprises a perspective detail view as configured in accordance with various embodiments of the invention.

When the movable barrier 1203 comprises instead a sliding barrier, and the post 200 includes the aforementioned rollers, this installation process can instead provide for installing the automatically-movable barrier 1203 to engage the one or more rollers as are available on the post 200.

Those skilled in the art will appreciate the reduced complexity of the installation process that these teachings can afford. It will also be recognized that the resultant installation is substantially (or fully) devoid of externally visible electrical connections. This results in an aesthetically more pleasing presentation. This also serves to increase the reliability of these electrical connections and their corresponding security. It will also be understood that such a post can be manufactured off-site from the point of installation (for example, in a manufacturing facility such as a factory). This, in turn, can lead to increased quality, greater economies of scale, less variability, and reduced costs.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, in some application settings there are two pivoting (or sliding) barriers that operate in tandem with another. In such a case, both barriers can have a corresponding post as has been described above. In cases where there is only a single operator that controls the motive actuator for each of these barriers, a wireless connection can serve to convey the corresponding instructions from the control circuitry to the motive actuator that is not connected to the control circuitry by the aforementioned low-voltage pathway. As another example in these regards, as noted above these teachings are applicable for use in conjunction with various peripheral elements including obstacle detectors. When each barrier in a two-barrier application setting has a corresponding obstacle detector, these teachings will accommodate sharing the outputs of these obstacle detectors with various shared components of the control circuitry for both such barriers.

We claim:

1. A method of installing a movable barrier, the operation of which is controlled by movable barrier control circuitry, the method comprises:

providing a non-rotating longitudinal post with a longitudinal axis, the post configured to support the movable barrier to thereby facilitate pivotal movement of the movable barrier with a linear actuator arm attached to the non-rotating longitudinal post, wherein the non-rotating longitudinal post comprises:
a top portion and a bottom portion;
a point of access at an external surface of the post, the post configured to provide access to power through the point of access;
at least one cavity extending axially and parallel to or along the longitudinal axis of the post;
a mains-power-bearing pathway from the bottom portion of the post to the top portion of the post, the mains-power-bearing pathway disposed within the at least one cavity to convey mains electrical power to the movable barrier control circuitry mounted on the post without exposing the pathway to view outside the post after installation and configured to convey mains electrical power to the point of access at the top portion of the post, the mains-power-bearing pathway configured to supply power at the point of access to a device remote from the movable barrier and unrelated to driving the movable barrier;
a linear actuator arm support surface extending from the post perpendicularly from the longitudinal axis of the post, the linear actuator arm support surface configured to support the linear actuator arm which pivots on an actuator arm axis of pivot which is perpendicular to the linear actuator arm support surface;
a barrier pivot configured to pivotally engage the movable barrier such that the movable barrier can pivot about the barrier pivot and a barrier pivot axis which extends through the barrier pivot and is parallel to the longitudinal axis of the longitudinal post; and
the barrier pivot and linear actuator arm support surface each extend from the longitudinal post, the barrier pivot axis and the actuator arm axis of pivot being along lines which correspond to a first and second axis which intersect at an intersection point, the first and second axes are perpendicular to each other and each of which are perpendicular to the longitudinal axis of the longitudinal post, the actuator arm axis of pivot is located on the linear actuator arm support surface at a distance A from the intersection point, the barrier pivot is located axis through the barrier pivot at a distance B from the intersection point, the distances A and B being equal, and one of the first and second axes is in a plane formed by the barrier when the barrier is at an end of its pivoting travel, the method further comprising:
installing the post by burying at least a portion of the bottom portion of the post underground such that the post is generally perpendicular to the ground;
coupling an electric mains to the mains-power-bearing pathway;
installing the movable barrier on the barrier pivot, the barrier being in spaced relation to the longitudinal post after installation;
coupling the movable barrier control circuitry to the mains-power-bearing pathway; and connecting a distal end of the linear actuator arm to the movable barrier and a proximal end of the linear actuator arm to the longitudinal post such that the proximal end of the linear actuator arm rests on the linear actuator arm support surface for pivotal movement of the arm as the arm moves the movable barrier.

2. The method of claim 1 wherein the method further comprises:
coupling at least one peripheral system element to the mains-power-bearing pathway at the point of access.

3. The method of claim 2 wherein the peripheral system element is selected from the group consisting of:
an obstacle detector,
a vehicle detector,
an access-control user interface,
lighting,
a camera,
a wireless interface, and
control electronics.

4. The method of claim 1 wherein the at least one cavity extends through a bottom end of the post and wherein coupling an electric mains to the mains-power-bearing pathway comprises coupling the electric mains to the mains-power-bearing pathway through the bottom end of the post.

5. The method of claim 1 wherein the post has a predetermined installed burial depth and wherein the at least one cavity extends to a point that is proximal to the predetermined installed burial depth and that is above the installed burial depth, and wherein the post further comprises a second externally-accessible point-of-access to the at least one cavity, wherein coupling an electric mains to the mains-power-bearing pathway comprises coupling the electric mains to the mains-power-bearing pathway via the second externally-accessible point-of-access.

6. A method of installing a movable barrier onto a non-rotating longitudinal post, the operation of the movable barrier being controlled by movable barrier control circuitry after installation and the longitudinal post preconfigured prior to installation to conduct mains electrical power, the longitudinal post configured to support the movable barrier and to facilitate pivotal movement of the movable barrier with respect to the longitudinal post, the longitudinal post further comprising:
a top portion and a bottom portion;
a point of access configured to provide access to mains electrical power through the point of access on an external portion of the top portion of the longitudinal post;
a barrier pivot configured to rotatably receive the movable barrier, the pivot extending from and being off-center relative to a longitudinal axis of the longitudinal post, the barrier pivot configured to pivotally engage the movable barrier such that the movable barrier can pivot about the barrier pivot and a barrier pivot axis which extends through the barrier pivot and is parallel to the longitudinal axis of the longitudinal post;
at least one cavity extending parallel to or along the longitudinal axis of the longitudinal post;
a mains-power-bearing pathway from the bottom portion of the longitudinal post to the top portion of the longitudinal post, the mains-power-bearing pathway disposed within the at least one cavity to convey mains electrical power to movable barrier control circuitry mounted on the post and to the point of access at the top portion of the longitudinal post, the mains-power-bearing pathway configured to convey mains electrical power to the control circuitry and a peripheral device at the point of access; and the longitudinal post further including a linear actuator arm support integral to the post, the linear actuator arm support having a support surface extending perpendicularly from the longitudinal axis of the longitudinal post, and the support surface configured to support a linear actuator arm which pivots around an actuator arm axis of pivot which is perpendicular to the linear actuator arm support, the barrier pivot and linear actuator arm support configured to position the linear actuator arm to connect to the movable barrier which moves generally horizontal to the ground and to control the pivotal movement of the movable barrier with the control circuitry with the mains-electrical power conveyed by the mains-power bearing pathway so that the mains-power bearing pathway is not exposed to view outside the post after installation, and the barrier pivot and linear actuator arm support each extend from the longitudinal post, the barrier pivot axis and the actuator arm axis of pivot being along lines which correspond to a first and second axis which intersect at an intersection point, the first and second axes are perpendicular to each other and which are perpendicular to the longitudinal axis of the longitudinal post, the actuator arm axis of pivot is located on the linear actuator arm support at a distance A from the intersection point, the barrier pivot axis is located at a distance B from the intersection point, the distances A and B being equal, and one of the first and second axes is in a plane formed by the barrier when the barrier is at an end of its pivoting travel, the method comprising:

coupling an electric mains to the mains-power-bearing pathway;

burying a portion of the longitudinal post underground;

mounting the movable barrier on the barrier pivot so that the barrier is held in spaced relation from the longitudinal post;

mounting the linear actuator arm on the support surface such that a proximal end of the linear actuator arm is supported by the support surface and is in spaced relation from the longitudinal post; and connecting a distal end of the linear actuator arm to the movable barrier for pivotal movement of the arm as the arm moves the movable barrier.

7. The method of claim 6 wherein the method further comprises:

coupling at least one peripheral system element to the mains-power-bearing pathway at the point of access.

8. The method of claim 7 wherein the peripheral system element is selected from the group consisting of:

an obstacle detector,
a vehicle detector,
an access-control user interface,
lighting,
a camera,
a wireless interface, and
control electronics.

9. The method of claim 6 wherein the at least one cavity extends through a bottom end of the post and wherein coupling an electric mains to the mains-power-bearing pathway comprises coupling the electric mains to the mains-power-bearing pathway through the bottom end of the post.

10. A method of installing a movable barrier, the operation of which is controlled by movable barrier control circuitry, the method comprises:

burying at least a bottom portion of a non-rotating longitudinal post in the ground, the longitudinal post having a longitudinal axis, a top and the bottom portion, such that at least a portion of the bottom portion of the longitudinal post is in the ground and the longitudinal post is generally perpendicular to the ground, the longitudinal post is configured to support the movable barrier in spaced relation from the longitudinal post and to facilitate movement of the movable barrier with respect to the longitudinal post;

mounting the movable barrier to the longitudinal post in spaced relation from the longitudinal post;

mounting a linear actuator arm having a distal and proximal end on a linear actuator arm mounting support extending from the longitudinal post;

mounting the movable barrier on a barrier pivot extending from the longitudinal post; and connecting the distal end of the linear actuator arm to the barrier; the longitudinal post further comprising:

a point of access at an external surface of the longitudinal post, the longitudinal post configured to provide access to power through the point of access;

at least one cavity extending axially and parallel to or along the longitudinal axis of the post;

control circuitry mounted on the longitudinal post;

a mains-power-bearing pathway from the bottom portion of the longitudinal post to the top portion of the longitudinal post, the mains-power-bearing pathway disposed within the at least one cavity to convey mains electrical power to the movable barrier control circuitry mounted on the longitudinal post without exposing the pathway to view outside the longitudinal post after installation and configured to convey mains electrical power to the point of access at the top portion of the longitudinal post, the mains-power-bearing pathway configured to supply power at the point of access to a device remote from the movable barrier and unrelated to driving the movable barrier;

the barrier pivot extending from the longitudinal post, and configured to pivotally engage the barrier to permit the barrier to pivot around a barrier pivot axis when the barrier is installed and which the barrier pivot axis is parallel to the longitudinal axis of the longitudinal post; and the linear actuator arm mounting support extending from the longitudinal post, the linear actuator arm mounting support configured to connect to a proximal end of the linear actuator arm and support the linear actuator arm at the proximal end of the arm so that the arm can pivot around an actuator arm axis extending through the linear actuator arm mounting support, the actuator arm axis being substantially parallel to the barrier pivot axis, and the barrier pivot and the linear actuator arm mounting support are configured and arranged after installation to hold the linear actuator arm and barrier in spaced relation from the longitudinal post and permit the linear actuator arm to power the barrier between the open and closed positions, and the barrier pivot and linear actuator arm mounting support each extend from the longitudinal post, the barrier pivot axis and the actuator arm axis being along lines which correspond to a first and second axis which intersect at an intersection point, the first and second axes are perpendicular to each other and which are perpendicular to the longitudinal axis of the longitudinal post, the actuator arm axis is located on the linear actuator arm mounting support at a distance A from the intersection point, the barrier pivot axis is located at a distance B from the intersection point, the distances A and B being equal, and one of the first and second axes is in a plane formed by the barrier when the barrier is at an end of its pivoting travel.

11. The method of claim 10 wherein the method further comprises:
coupling at least one peripheral system element to the mains-power-bearing pathway at the point of access.

12. The method of claim 11 wherein the peripheral system element is selected from the group consisting of:
an obstacle detector,
a vehicle detector,
an access-control user interface,
lighting,
a camera,
a wireless interface, and
control electronics.

13. The method of claim 10 wherein the at least one cavity extends through a bottom end of the post and wherein coupling an electric mains to the mains-power-bearing pathway comprises coupling the electric mains to the mains-power-bearing pathway through the bottom end of the post.

14. A method of installing a movable barrier, the operation of which is controlled by movable barrier control circuitry, the method comprises:
providing a non-rotating longitudinal post with a longitudinal axis, the post configured to support the movable barrier to thereby facilitate pivotal movement of the movable barrier with a linear actuator arm attached to the non-rotating longitudinal post, wherein the non-rotating longitudinal post comprises:
a top portion and a bottom portion;
a point of access at an external surface of the post, the post configured to provide access to power through the point of access;
at least one cavity extending axially and parallel to or along the longitudinal axis of the post;
a mains-power-bearing pathway from the bottom portion of the post to the top portion of the post, the mains-power-bearing pathway disposed within the at least one cavity to convey mains electrical power to the movable barrier control circuitry mounted on the post without exposing the pathway to view outside the post after installation and configured to convey mains electrical power to the point of access at the top portion of the post, the mains-power-bearing pathway configured to supply power at the point of access to a device remote from the movable barrier and unrelated to driving the movable barrier;
a linear actuator arm support surface extending from the post perpendicularly from the longitudinal axis of the post, the linear actuator arm support surface configured to support the linear actuator arm which pivots on an actuator arm axis of pivot which is perpendicular to the linear actuator arm support surface;
a barrier pivot configured to pivotally engage the movable barrier such that the movable barrier can pivot about the barrier pivot and a barrier pivot axis which extends through the barrier pivot and is parallel to the longitudinal axis of the longitudinal post; and
the barrier pivot and linear actuator arm support surface each extend from the longitudinal post, the barrier pivot axis and the actuator arm axis of pivot being along lines which correspond to a first and second axis which intersect at an intersection point along the longitudinal axis of the longitudinal post, the first and second axes are perpendicular to each other and each of which are perpendicular to the longitudinal axis of the longitudinal post, the actuator arm axis of pivot is located on the linear actuator arm support surface at a distance A from the intersection point, the barrier pivot axis through the barrier pivot is located a distance B from the intersection point, the distances A and B being equal, and one of the first and second axes is in a plane formed by the barrier when the barrier is at an end of its pivoting travel,
the method further comprising:
installing the post by burying at least a portion of the bottom portion of the post underground such that the post is generally perpendicular to the ground;
coupling an electric mains to the mains-power-bearing pathway;
installing the movable barrier on the barrier pivot, the barrier being in spaced relation to the longitudinal post after installation;
coupling the movable barrier control circuitry to the mains-power-bearing pathway; and
connecting a distal end of the linear actuator arm to the movable barrier and a proximal end of the linear actuator arm to the longitudinal post such that the proximal end of the linear actuator arm rests on the linear actuator arm support surface for pivotal movement of the arm as the arm moves the movable barrier.

15. The method of claim 14 wherein the method further comprises:
coupling at least one peripheral system element to the mains-power-bearing pathway at the point of access.

16. The method of claim 15 wherein the peripheral system element is selected from the group consisting of:
an obstacle detector,
a vehicle detector,
an access-control user interface,
lighting,
a camera,
a wireless interface, and
control electronics.

* * * * *

UNITED STATES PATENT AND TRADEMARK OFFICE
CERTIFICATE OF CORRECTION

| | | |
|---|---|---|
| PATENT NO. | : 8,584,401 B2 | Page 1 of 1 |
| APPLICATION NO. | : 12/331978 | |
| DATED | : November 19, 2013 | |
| INVENTOR(S) | : Randy L. Planck, Theodore Brent Freese and William G. Gioia | |

It is certified that error appears in the above-identified patent and that said Letters Patent is hereby corrected as shown below:

IN THE CLAIMS:

Claim 1, Column 9, Line 52: After "pivot" delete "is located"; and

Claim 1, Column 9, Line 53: After "pivot" insert -- located --.

Signed and Sealed this
Sixth Day of May, 2014

Michelle K. Lee
*Deputy Director of the United States Patent and Trademark Office*